July 17, 1923.
S. KERR
1,462,233
KICK-OFF FOR HAND TRUCKS
Filed July 5, 1921
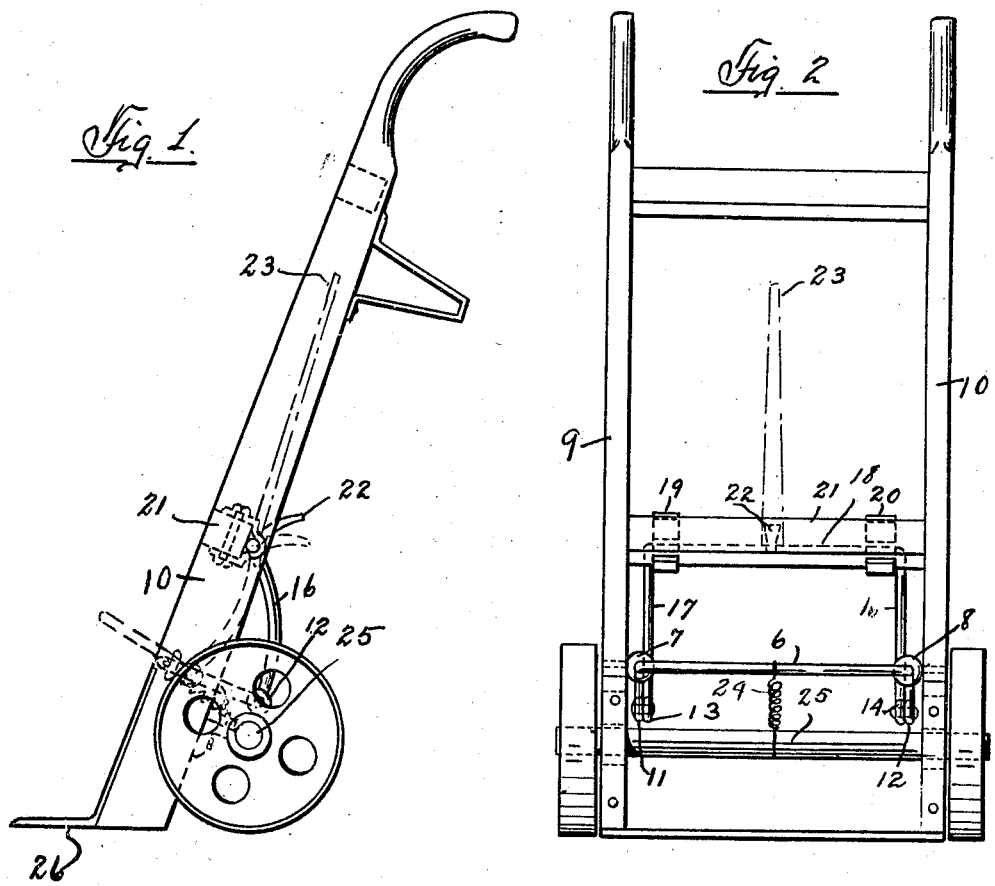
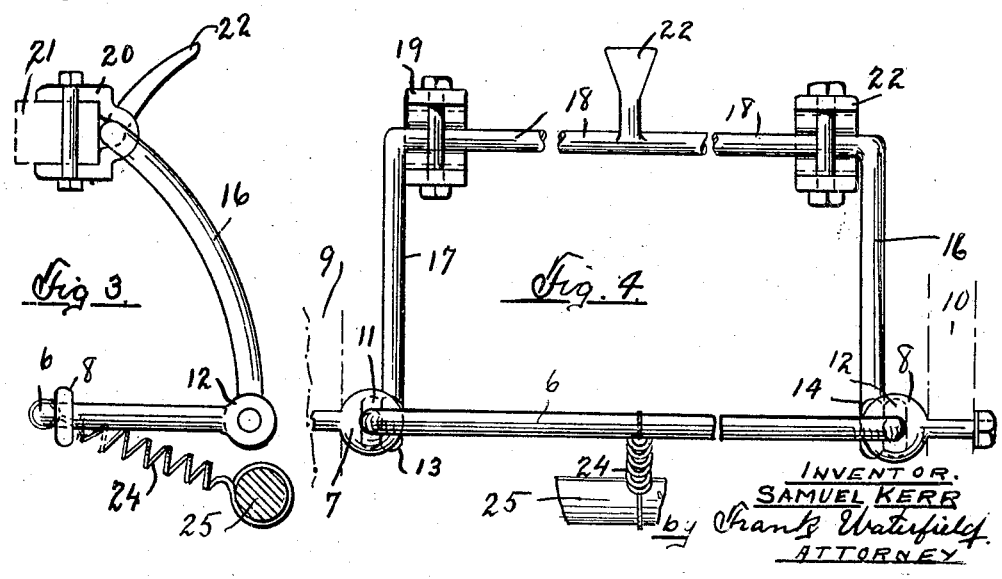
INVENTOR.
SAMUEL KERR
by Frank Waterfield
ATTORNEY Patented July 17, 1923.

1,462,233

UNITED STATES PATENT OFFICE.

SAMUEL KERR, OF CARUTHERS, CALIFORNIA.

KICK-OFF FOR HAND TRUCKS.

Application filed July 5, 1921. Serial No. 482,479.

*To all whom it may concern:*

Be it known that I, SAMUEL KERR, a citizen of Great Britain (having filed my intention of becoming a citizen of the United States), and a resident of Caruthers, in the county of Fresno and State of California, have invented certain new and useful Improvements in Kick-Offs for Hand Trucks, of which the following is a specification.

Heretofore in the use of hand trucks, such as are used in warehouses and the like, when unloading the same it has been necessary for the user of the truck to either push against the top of the package to raise the package high enough to withdraw the fender of the truck from beneath the same, or else work the truck from side to side until the fender of the truck was withdrawn from beneath the package. It is the object of my invention to provide an attachment to hand trucks by means of which packages may be forced off the fender of the truck, which attachment may be operated either by the foot or the hand of the operator thereby overcoming the objections to the present method and greatly facilitating the unloading of hand trucks.

A further object is to provide a cheap, simple and efficient device for the above purpose which may be easily and quickly attached to or detached from a truck without materially altering the same.

Other objects and advantages will appear hereinafter, and while I have shown and will describe the preferred form of my invention it will be understood that I do not limit myself to such preferred form but that various changes and adaptations may be made therein without departing from the spirit of my invention.

In the drawings accompanying and forming a part hereof:

Fig. 1 is a side elevation of a truck equipped with my device.

Fig. 2 is a front elevation of a truck equipped with my device.

Fig. 3 is an enlarged side elevation of my device as positioned for use in its non-operative position.

Fig. 4 is a left hand elevation of Fig. 3 partly broken away.

Referring to the drawings, my device comprises an inverted U-shaped member 6 slidably mounted in eyebolts 7 and 8, which bolts are rotatably mounted in the side bars 9 and 10 of the truck. The free ends of member 6 terminate in eyes 11 and 12, which eyes are pivotally connected to eyes 13 and 14 formed on the free ends 16 and 17 of lifting member 18. Member 18 is rotatably mounted in bearings 19 and 20 secured to the cross bar 21 of the truck. Extending rearwardly from member 18 is a foot lever 22 by means of which the device is operated. In lieu of lever 22 a hand lever 23, shown in dotted lines in Figure 1. may be substituted, or both lever 22 and 23 may be used if desired. A coil spring 24 is secured at one end on axle 25 of the truck, and at its other end is secured to member 6 and serves to return the device to its normal inoperative position.

In the operation of my device with the truck loaded the parts will be in their normal inoperative position as shown in the drawings. When it is desired to unload the truck the operator will press downwardly on lever 22 with his foot, or will pull rearwardly on lever 23 with his hand, thereby forcing lifting member 6 forwardly to the position shown in dotted lines in Figure 1, thereby forcing the lower end of the package from off the fender 26. When lever 22 or 23 is released spring 24 will return the parts to their normal inoperative position.

Having described my invention what I claim is:

1. In a hand truck the combination of a frame composed of side members, and cross members; wheels on one end of said frame adapted to support the same; handles on the other end of said frame; legs near said handles adapted to support said frame in a horizontal position; a fender on the end of said frame near said wheels adapted to prevent accidental displacement of the load carried by said frame; in combination with a kick-off device comprising a substantially U-shaped operating member pivotally mounted on the under side of one of the cross bars of said frame and having its free ends curved to extend downwardly and forwardly and terminating in eyes; a lever extending downwardly and outwardly from the center of said operating member, between its bearings; a substantially inverted U-shaped elevating member having its free ends terminating in eyes, said eyes being pivotally connected to the eyes of said first member; bearings pivotally mounted in the sides of said frame to extend outwardly therefrom adapted to have slidably mounted therein the legs of said U-shaped elevating member; and a coil spring connected at one end to the cross bars of said elevating member, and at its other end to the axle of said truck, adapted to normally hold said elevating member in its inoperative position.

2. An unloading device for hand trucks comprising an inverted U-shaped lifting member mounted transversely of said truck and having its arms slidably mounted in bearings pivotally mounted in the side bars of said truck, the free ends of said arms terminating in eyes; a substantially U-shaped operating member rotatably mounted in bearings secured to the under side of one of the cross bars of said truck to extend transversely thereof, and having its free ends terminating in eyes adapted to be pivotally connected to the eyes of said lifting member; an operating lever extending from said operating member adapted to be operated to cause said operating member to force said lifting member upwardly whereby the lower end of the truck load is forced from the fender of said truck; and a coil spring extending from said lifting member to the truck axle adapted to return said members to their normal inoperative position.

3. The combination of a rectangular frame; wheels supporting one end of said frame; legs on the other end of said frame adapted to support said frame in a horizontal position with said wheels; handles on the free end of said frame; a fender on the other end of said frame near said wheels, adapted to retain the load carried by said truck against accidental displacement; in combination with a kick-off device comprising a substantially U-shaped member pivotally mounted on the under side of said frame, transversely thereof, and having its legs extending downwardly and forwardly adjacent the inner sides of said frame, having its free ends terminating in eyes; bearings pivotally mounted on the inner sides of said frame in opposed relation; a substantially inverted U-shaped elevating member mounted transversely of said frame and having its legs slidably mounted in said bearings and having its free ends terminating in eyes, the eyes of both of said U-shaped members being pivotally connected together; an operating lever extending rearwardly and downwardly from the center of the cross bar of said first U-shaped member integral therewith; and a coil spring mounted between the cross bar of said elevating member and the axle of said wheels, adapted to normally hold said elevating member in its inoperative position.

In witness that I claim the foregoing I have hereunto set my hand this 14 day of June, 1921.

SAMUEL KERR.